US007437386B2

(12) United States Patent
Callahan et al.

(10) Patent No.: US 7,437,386 B2
(45) Date of Patent: Oct. 14, 2008

(54) SYSTEM AND METHOD FOR A MULTI-NODE ENVIRONMENT WITH SHARED STORAGE

(75) Inventors: Michael J. Callahan, Berkeley, CA (US); Corene Casper, Round Rock, TX (US); Kenneth F. Dove, Banks, OR (US); Brent A. Kingsbury, Beaverton, OR (US); Phil E. Krueger, Lake Oswego, OR (US); Terence M. Rokop, Hillsboro, OR (US); Michael J. Spitzer, Portland, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 783 days.

(21) Appl. No.: 10/251,895

(22) Filed: Sep. 20, 2002

(65) Prior Publication Data
US 2003/0065686 A1 Apr. 3, 2003

Related U.S. Application Data

(60) Provisional application No. 60/327,191, filed on Oct. 1, 2001, provisional application No. 60/324,787, filed on Sep. 24, 2001, provisional application No. 60/324,243, filed on Sep. 21, 2001, provisional application No. 60/324,195, filed on Sep. 21, 2001, provisional application No. 60/324,242, filed on Sep. 21, 2001, provisional application No. 60/324,224, filed on Sep. 21, 2001, provisional application No. 60/324,226, filed on Sep. 21, 2001, provisional application No. 60/324,196, filed on Sep. 21, 2001.

(51) Int. Cl.
*G06F 17/30* (2006.01)
(52) U.S. Cl. ................................... 707/200
(58) Field of Classification Search ................ 707/1, 707/2, 10, 200, 8; 711/165; 709/224
See application file for complete search history.

(56) References Cited

U.S. PATENT DOCUMENTS

| 5,276,872 A | 1/1994 | Lomet et al. ............... 395/600 |
| 5,438,464 A | 8/1995 | Lewis et al. ............. 360/73.03 |
| 5,678,026 A | 10/1997 | Vartti et al. ................ 395/479 |

(Continued)

FOREIGN PATENT DOCUMENTS

JP   H9-114721   10/1995

(Continued)

OTHER PUBLICATIONS

Lomet, David; *Private Locking and Distributed Cache Management*; Proceedings of the Third International Conference on Parallel and Distributed Information Systems (PDIS 94), Austin, TX; Sep. 28-30, 1994.

(Continued)

*Primary Examiner*—Etienne P LeRoux

(57) ABSTRACT

A system and method are disclosed for providing multi-node environment comprising a first node associated with a first operating system; a second node associated with a second operating system, wherein the second operating system is independent of the first operating system; a storage; and an interconnect coupling the first node with the storage and coupling the second node with the storage; and wherein the first node directly accesses the storage and the second node directly accesses the storage.

18 Claims, 18 Drawing Sheets

U.S. PATENT DOCUMENTS

| | | | |
|---|---|---|---|
| 5,751,992 A | 5/1998 | Bhargava et al. | 395/457 |
| 5,813,016 A | 9/1998 | Sumimoto | 707/201 |
| 5,850,507 A | 12/1998 | Ngai et al. | 707/202 |
| 5,909,540 A | 6/1999 | Carter et al. | 395/182.02 |
| 5,913,227 A | 6/1999 | Raz et al. | 711/152 |
| 5,920,872 A | 7/1999 | Grewell et al. | 707/202 |
| 5,953,719 A | 9/1999 | Kleewein et al. | 707/8 |
| 5,960,446 A | 9/1999 | Schmuck et al. | 707/205 |
| 5,974,250 A * | 10/1999 | Angelo et al. | 713/100 |
| 5,987,506 A | 11/1999 | Carter et al. | 709/213 |
| 6,009,466 A | 12/1999 | Axberg et al. | 709/220 |
| 6,016,505 A | 1/2000 | Badovinatz et al. | |
| 6,021,508 A | 2/2000 | Schmuck et al. | 714/4 |
| 6,026,426 A | 2/2000 | Badovinatz et al. | |
| 6,026,474 A | 2/2000 | Carter et al. | 711/202 |
| 6,044,367 A | 3/2000 | Wolff | 707/2 |
| 6,108,654 A | 8/2000 | Chan et al. | 707/8 |
| 6,154,512 A | 11/2000 | Homan | 375/376 |
| 6,163,855 A | 12/2000 | Shrivastava et al. | 714/4 |
| 6,226,717 B1 | 5/2001 | Reuter et al. | 711/147 |
| 6,256,740 B1 | 7/2001 | Muller et al. | 713/201 |
| 6,269,410 B1 | 7/2001 | Spasojevic | 710/5 |
| 6,272,491 B1 | 8/2001 | Chan et al. | 707/8 |
| 6,370,625 B1 | 4/2002 | Carmean et al. | 711/152 |
| 6,421,723 B1 | 7/2002 | Tawil | 709/224 |
| 6,530,004 B1 * | 3/2003 | King et al. | 711/165 |
| 6,633,904 B1 | 10/2003 | Shinkai | |
| 2001/0042221 A1 | 11/2001 | Moulton et al. | 714/5 |
| 2002/0069340 A1 * | 6/2002 | Tindal et al. | 711/203 |
| 2002/0091854 A1 | 7/2002 | Smith | 709/236 |
| 2002/0101946 A1 | 8/2002 | Hartman et al. | 375/376 |
| 2002/0150126 A1 | 10/2002 | Kovacevik | 370/503 |
| 2002/0161855 A1 * | 10/2002 | Manczak et al. | 709/219 |
| 2002/0188590 A1 * | 12/2002 | Curran et al. | 707/1 |

FOREIGN PATENT DOCUMENTS

| | | |
|---|---|---|
| JP | 2001-084168 | 9/1998 |
| JP | H11-143843 | 5/1999 |
| WO | WO 00/62502 A2 | 10/2000 |

OTHER PUBLICATIONS

Farnam Jahanian et al: "Processor Group Membership Protocols: Specification, Design and Implementation" Proceedings of the Symposium on Reliable Distributed Systems. Princeton, Oct. 6-8, 1993, Lose Alamitos, IEEE Comp. Soc. Press, US, vol. SYMP. 12, Oct. 6, 1993, pp. 2-11, XP000448683.

"Storage & Data Backup," Nikkei Computer, No. 491, Nikkei BP K.K., Mar. 13, 2000, pp. 238-248.

* cited by examiner

SYSTEM AND METHOD FOR A MULTI-NODE ENVIRONMENT WITH SHARED STORAGE

CROSS REFERENCE TO RELATED APPLICATIONS

This application claims priority to U.S. Provisional Patent Application No. 60/324,196 entitled SHARED STORAGE LOCK: A NEW SOFTWARE SYNCHRONIZATION MECHANISM FOR ENFORCING MUTUAL EXCLUSION AMONG MULTIPLE NEGOTIATORS filed Sep. 21, 2001, which is incorporated herein by reference for all purposes.

This application claims priority to U.S. Provisional Patent Application No. 60/324,226 entitled JOUNALING MECHANISM WITH EFFICIENT, SELECTIVE RECOVERY FOR MULTI-NODE ENVIRONMENTS filed Sep. 21, 2001, which is incorporated herein by reference for all purposes.

This application claims priority to U.S. Provisional Patent Application No. 60/324,224 entitled COLLABORATIVE CACHING IN A MULTI-NODE FILESYSTEM filed Sep. 21, 2001, which is incorporated herein by reference for all purposes.

This application claims priority to U.S. Provisional Patent Application No 60/324,242 entitled DISTRIBUTED MANAGEMENT OF A STORAGE AREA NETWORK filed Sep. 21, 2001, which is incorporated herein by reference for all purposes.

This application claims priority to U.S. Provisional Patent Application No. 60/324,195 entitled METHOD FOR IMPLEMENTING JOURNALING AND DISTRIBUTED LOCK MANAGEMENT filed Sep. 21, 2001, which is incorporated herein by reference for all purposes.

This application claims priority to U.S. Provisional Patent Application No. 60/324,243 entitled MATRIX SERVER: A HIGHLY AVAILABLE MATRIX PROCESSING SYSTEM WITH COHERENT SHARED FILE STORAGE filed Sep. 21, 2001, which is incorporated herein by reference for all purposes.

This application claims priority to U.S. Provisional Patent Application No. 60/324,787 entitled A METHOD FOR EFFICIENT ON-LINE LOCK RECOVERY IN A HIGHLY AVAILABLE MATRIX PROCESSING SYSTEM filed Sep. 24, 2001, which is incorporated herein by reference for all purposes.

This application claims priority to U.S. Provisional Patent Application No. 60/327,191 entitled FAST LOCK RECOVERY: A METHOD FOR EFFICIENT ON-LINE LOCK RECOVERY IN A HIGHLY AVAILABLE MATRIX PROCESSING SYSTEM filed Oct. 1, 2001, which is incorporated herein by reference for all purposes.

This application is related to co-pending U.S. patent application Ser. No. 10/251,689 entitled A SYSTEM AND METHOD FOR SYNCHRONIZATION FOR ENFORCING MUTUAL EXCLUSION AMONG MULTIPLE NEGOTIATORS filed concurrently herewith, which is incorporated herein by reference for all purposes; and U.S. patent application Ser. No. 10/251,626 entitled SYSTEM AND METHOD FOR JOURNAL RECOVERY FOR MULTINODE ENVIRONMENTS filed concurrently herewith, which is incorporated herein by reference for all purposes; and co-pending U.S. patent application Ser. No. 10/251,690 entitled A SYSTEM AND METHOD FOR MANAGEMENT OF A STORAGE AREA NETWORK filed concurrently herewith, which is incorporated herein by reference for all purposes; and co-pending U.S. patent application Ser. No. 10/251,894 entitled SYSTEM AND METHOD FOR IMPLEMENTING JOURNALING IN A MULTI-NODE ENVIRONMENT filed concurrently herewith, which is incorporated herein by reference for all purposes; and co-pending U.S. patent application Ser. No. 10/251,895 entitled A SYSTEM AND METHOD FOR A MULTI-NODE ENVIRONMENT WITH SHARED STORAGE filed concurrently herewith, which is incorporated herein by reference for all purposes; and co-pending U.S. patent application Ser. No. 10/251,893 entitled A SYSTEM AND METHOD FOR EFFICIENT LOCK RECOVERY filed concurrently herewith, which is incorporated herein by reference for all purposes.

FIELD OF THE INVENTION

The present invention relates generally to computer systems. In particular, the present invention relates to computer systems that share resources such as storage.

BACKGROUND OF THE INVENTION

Servers are typically used for big applications and work loads such as those used in conjunction with large web services and manufacturing. Often, a single server does not have enough power to perform the required application. Several servers may be used in conjunction with several storage devices in a storage area network (SAN) to accommodate heavy traffic. As systems get larger, applications often become important enough to avoid shutting off access to perform maintenance.

A typical server management system uses a single management control station that manages the servers and the shared storage. A potential problem of such a system is that it may have a single point of failure which can cause a shut-down of the entire storage area network to perform maintenance. Another potential problem is that there is typically no dynamic cooperation between the servers in case a change to the system occurs.

Such systems typically use large mainframes. A problem with the mainframes is that they are very expensive. Another possible system may use smaller computers but this solution typically requires customized hardware as well as a customized operating system that coordinates the computers to work as though it was one large machine with one operating system between them. Obtaining and maintaining customized hardware can be very costly.

What is needed is a system and method for a multi-node environment with shared storage provided at a lower price. The present invention addresses such a need.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention are provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 1:
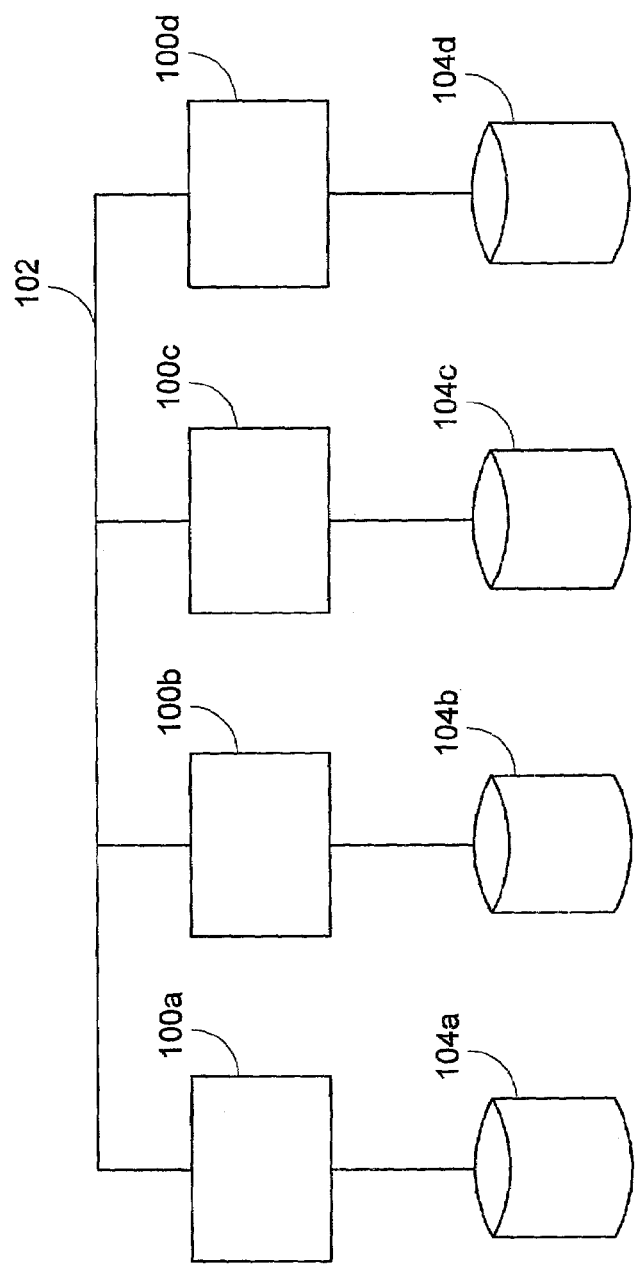
FIG. 1 is a block diagram of an example of a typical server system.

FIG. 1 is a block diagram of a conventional server system. In this example, computers 100A-100D are networked together by network 102. Each of the computers 100A-100D have their own locally connected storage 104A-104D. Business computing typically requires regular sharing of information but this type of system can be slow to access shared information or it might require very expensive customized hardware.

Figure 2:
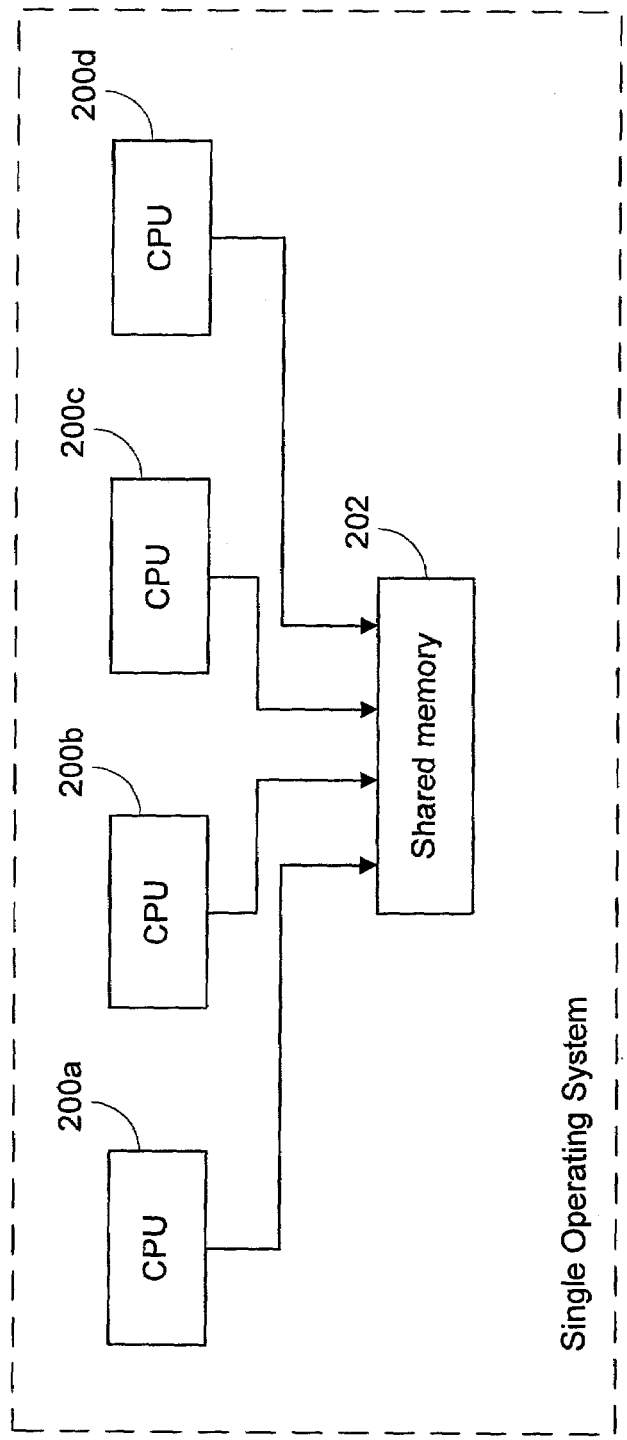
FIG. 2 is a block diagram of another example of a typical server system.

FIG. 2 is a block diagram of another conventional system. In this example, the various servers 200A-200D all use a single operating system across all of the servers 200A-200D. This type of system can be very expensive since it typically requires customized hardware. Another problem with this type of system is that if there is a fault in a single computer 200A-200D, the entire multi-server system would likely need to shut down. Accordingly, each computer needs to be more reliable than the standard computer, thus further raising costs.

What is needed is a system and method for a multi-node environment that does not require customized hardware components. The present invention addresses such a need.

Figure 3:
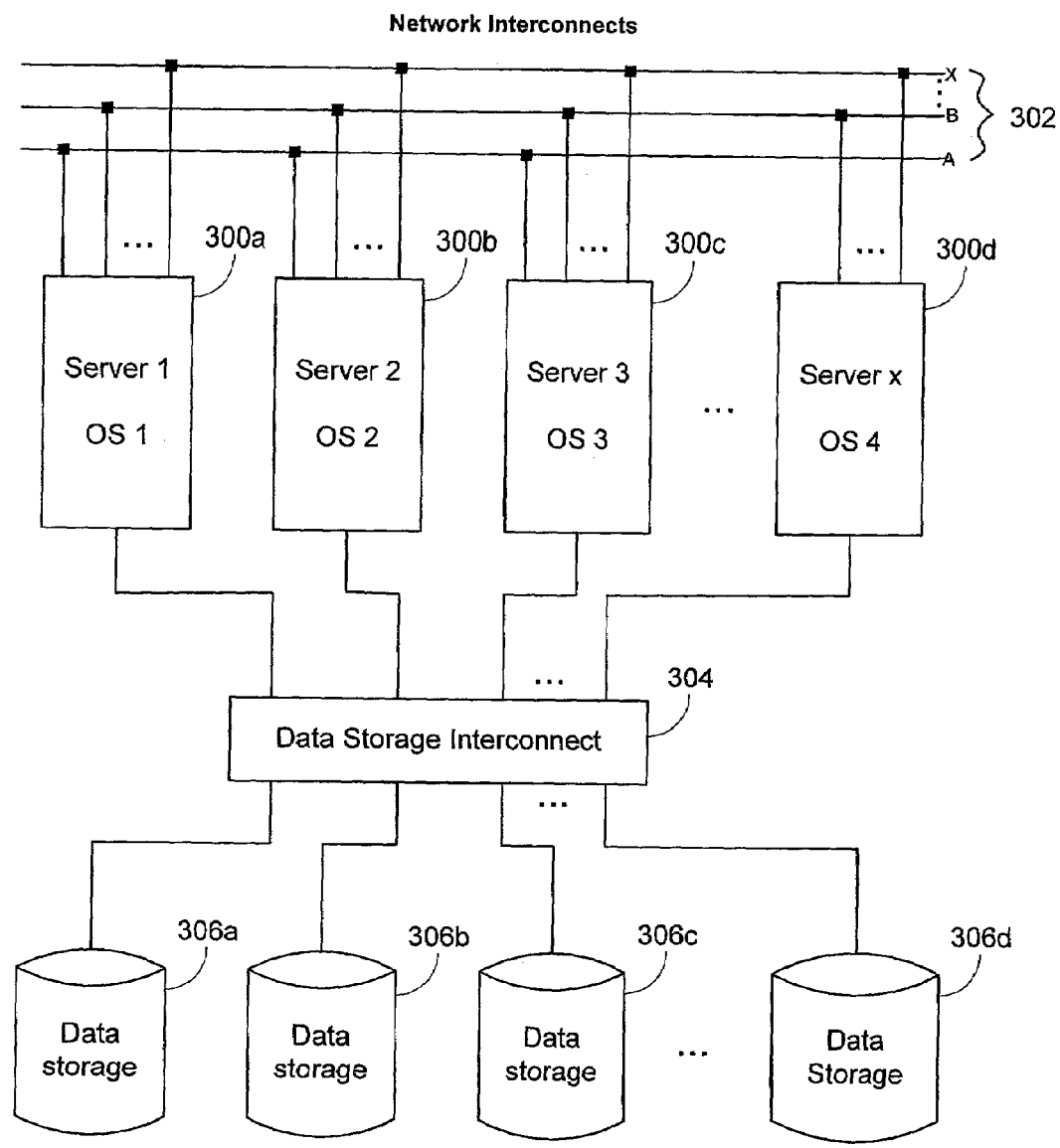
FIG. 3 is a block diagram of a system for a multi-node environment according to an embodiment of the present invention.

FIG. 3 is a block diagram of a system for a multi-node environment according to an embodiment of the present invention. In this example, servers 300A-300D are coupled via network interconnects 302. The network interconnects 302 can represent any network infrastructure such as an Ethernet, InfiniBand network or Fibre Channel network capable of host-to-host communication. The servers 300A-300D are also coupled to the data storage interconnect 304, which in turn is coupled to shared storage 306A-306D. The data storage interconnect 304 can be any interconnect that can allow access to the shared storage 306A-306D by servers 300A-300D. An example of the data storage interconnect 304 is a Fibre Channel switch, such as a Brocade 3200 Fibre Channel switch. Alternately, the data storage network might be an iSCSI or other IP storage network, InfiniBand network, or another kind of host-to-storage network. In addition, the network interconnects 302 and the data storage interconnect 304 may be embodied in a single interconnect.

Servers 300A-300D can be any computer, preferable an off-the-shelf computer or server or any equivalent thereof. Servers 300A-300D can each run operating systems that are independent of each other. Accordingly, each server 300A-300D can, but does not need to, run a different operating system. For example, server 300A may run Microsoft windows, while server 300B runs Linux, and server 300C can simultaneously run a Unix operating system. An advantage of running independent operating systems for the servers 300A-300D is that the entire multi-node system can be dynamic. For example, one of the servers 300A-300D can fail while the other servers 300A-300D continue to operate.

The shared storage 306A-306D can be any storage device, such as hard drive disks, compact disks, tape, and random access memory. A filesystem is a logical entity built on the shared storage. Although the shared storage 306A-306D is typically considered a physical device while the filesystem is typically considered a logical structure overlaid on part of the storage, the filesystem is sometimes referred to herein as shared storage for simplicity. For example, when it is stated that shared storage fails, it can be a failure of a part of a filesystem, one or more filesystems, or the physical storage device on which the filesystem is overlaid. Accordingly, shared storage, as used herein, can mean the physical storage device, a portion of a filesystem, a filesystem, filesystems, or any combination thereof.

Figure 4:
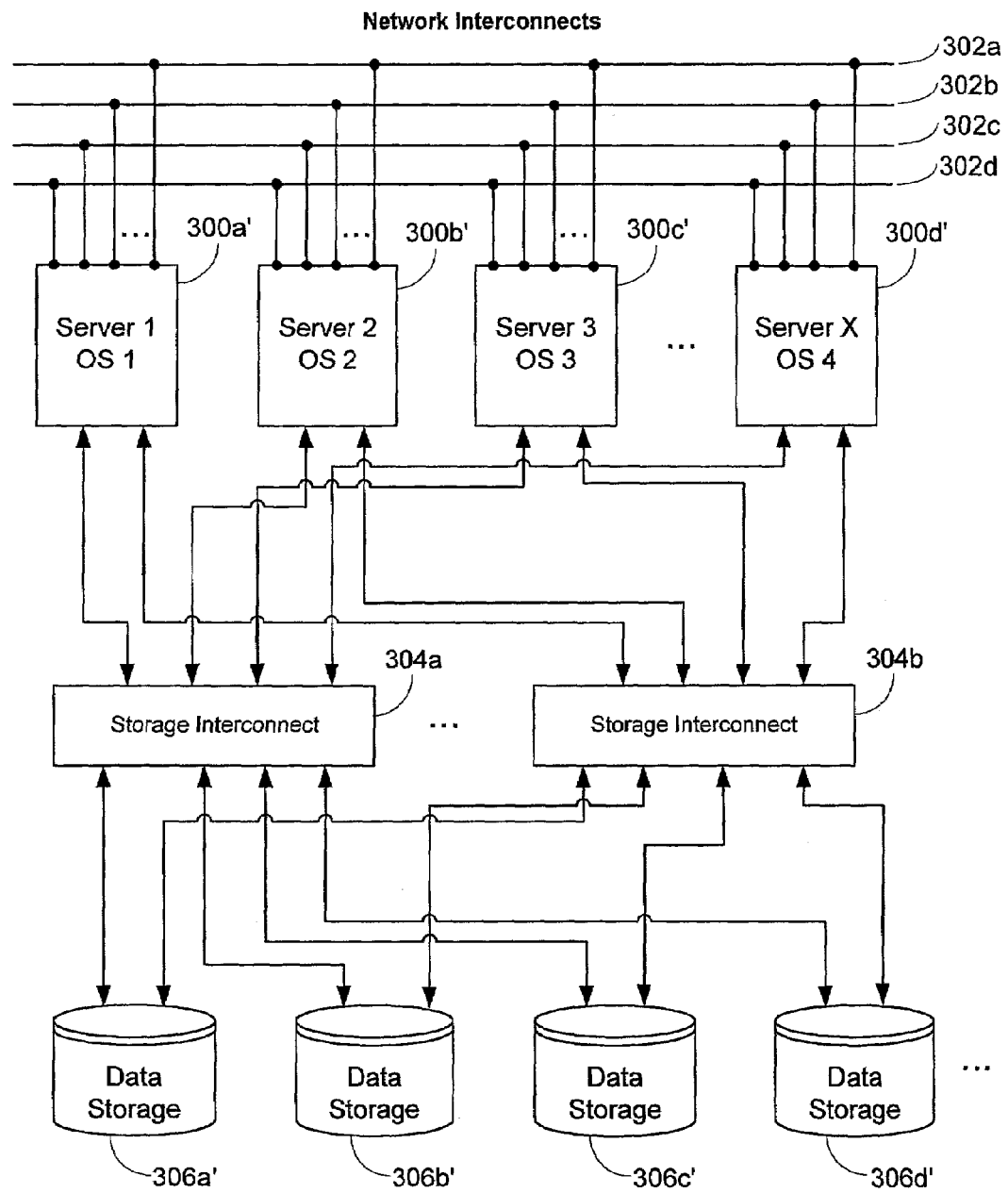
FIG. 4 is another block diagram of a system according to an embodiment of the present invention.

FIG. 4 is another block diagram of a system according to an embodiment of the present invention. In this example, the system preferably has no single point of failure. Accordingly, servers 300A'-300D' are coupled with multiple network interconnects 302A-302D. The servers 300A'-300D' are also shown to be coupled with multiple storage interconnects 304A-304B. The storage interconnects 304A-304B are each coupled to a plurality of data storage 306A'-306D'.

In this manner, there is redundancy in the system such that if any of the components or connections fail, the entire system can continue to operate.

In the example shown in FIG. 4, as well as the example shown in FIG. 3, the number of servers 300A'-300D', the number of storage interconnects 304A-304B, and the number of data storage 306A'-306D' can be as many as the customer requires and is not physically limited by the system. Likewise, the operating systems used by servers 300A'-300D' can also be as many independent operating systems as the customer requires.

Figure 5:
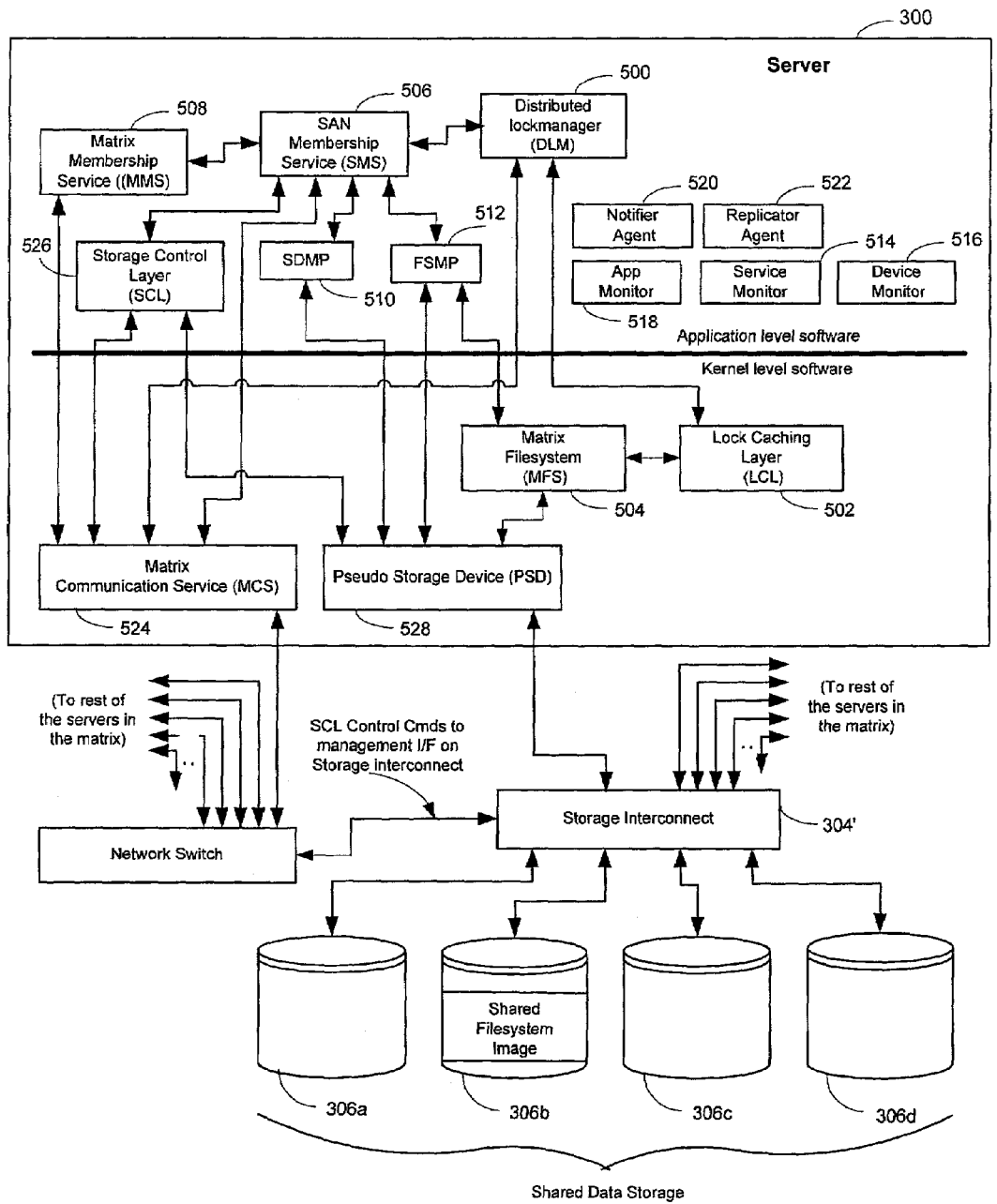
FIG. 5 is a block diagram of the software components of server 300 according to an embodiment of the present invention.

FIG. 5 is a block diagram of the software components of server 300 according to an embodiment of the present invention. In an embodiment of the present invention, each server 300A-300D of FIG. 3 includes these software components.

In this embodiment, the following components are shown:

The Distributed Lock Manager (DLM) 500 manages matrix-wide locks for the filesystem image 306a-306d, including the management of lock state during crash recovery. The Matrix Filesystem 504 uses DLM 500—managed locks to implement matrix-wide mutual exclusion and matrix-wide filesystem 306a-306d metadata and data cache consistency. The DLM 500 is a distributed symmetric lock manager. Preferably, there is an instance of the DLM 500 resident on every server in the matrix. Every instance is a peer to every other instance; there is no master/slave relationship among the instances.

The lock-caching layer ("LCL") 502 is a component internal to the operating system kernel that interfaces between the Matrix Filesystem 504 and the application-level DLM 500. The purposes of the LCL 502 include the following:

1. It hides the details of the DLM 500 from kernel-resident clients that need to obtain distributed locks.
2. It caches DLM 500 locks (that is, it may hold on to DLM 500 locks after clients have released all references to them), sometimes obviating the need for kernel components to communicate with an application-level process (the DLM 500) to obtain matrix-wide locks.
3. It provides the ability to obtain locks in both process and server scopes (where a process lock ensures that the corresponding DLM (500) lock is held, and also excludes local processes attempting to obtain the lock in conflicting modes, whereas a server lock only ensures that the DLM (500) lock is held, without excluding other local processes).
4. It allows clients to define callouts for different types of locks when certain events related to locks occur, particularly the acquisition and surrender of DLM 500—level locks. This ability is a requirement for cache-coherency, which depends on callouts to flush modified cached data to permanent storage when corresponding DLM 500 write locks are downgraded or released, and to purge cached data when DLM 500 read locks are released.

The LCL 502 is the only kernel component that makes lock requests from the user-level DLM 500. It partitions DLM 500 locks among kernel clients, so that a single DLM 500 lock has at most one kernel client on each node, namely, the LCL 502 itself. Each DLM 500 lock is the product of an LCL 502 request, which was induced by a client's request of an LCL 502 lock, and each LCL 502 lock is backed by a DLM 500 lock.

The Matrix Filesystem 504 is the shared filesystem component of The Matrix Server. The Matrix Filesystem 504 allows multiple servers to simultaneously mount, in read/write mode, filesystems living on physically shared storage devices 306a-306d. The Matrix Filesystem 504 is a distributed symmetric matrixed filesystem; there is no single server that filesystem activity must pass through to perform filesystem activities. The Matrix Filesystem 504 provides normal local filesystem semantics and interfaces for clients of the filesystem.

SAN (Storage Area Network) Membership Service 506 provides the group membership services infrastructure for the Matrix Filesystem 504, including managing filesystem membership, health monitoring, coordinating mounts and unmounts of shared filesystems 306a-306d, and coordinating crash recovery.

Matrix Membership Service 508 provides the Local, matrix-style matrix membership support, including virtual host management, service monitoring, notification services, data replication, etc. The Matrix Filesystem 504 does not interface directly with the MMS 508, but the Matrix Filesystem 504 does interface with the SAN Membership Service 506, which interfaces with the MMS 508 in order to provide the filesystem 504 with the matrix group services infrastructure.

The Shared Disk Monitor Probe 510 maintains and monitors the membership of the various shared storage devices in the matrix. It acquires and maintains leases on the various shared storage devices in the matrix as a protection against rogue server "split-brain" conditions. It communicates with the SMS 506 to coordinate recovery activities on occurrence of a device membership transition.

Filesystem monitors 512 are used by the SAN Membership Service 508 to initiate Matrix Filesystem 504 mounts and unmounts, according to the matrix configuration put in place by the Matrix Server user interface.

The Service Monitor 514 tracks the state (health & availability) of various services on each server in the matrix so that the matrix server may take automatic remedial action when the state of any monitored service transitions. Services monitored include HTTP, FTP, Telnet, SMTP, etc. The remedial actions include service restart on the same server or service fail-over and restart on another server.

The Device Monitor 516 tracks the state (health & availability) of various storage-related devices in the matrix so that the matrix server may take automatic remedial action when the state of any monitored device transitions. Devices monitored may include data storage devices 306a-306d (such as storage device drives, solid state storage devices, ram storage devices, JOBDs, RAID arrays, etc.)and storage network devices 304' (such as FibreChannel Switches, Infiniband Switches, iSCSI switches, etc.). The remedial actions include initiation of Matrix Filesystem 504 recovery, storage network path failover, and device reset.

The Application Monitor 518 tracks the state (health & availability) of various applications on each server in the matrix so that the matrix server may take automatic remedial action when the state of any monitored application transitions. Applications monitored may include databases, mail routers, CRM apps, etc. The remedial actions include application restart on the same server or application fail-over and restart on another server.

The Notifier Agent 520 tracks events associated with specified objects in the matrix and executes supplied scripts of commands on occurrence of any tracked event.

The Replicator Agent 522 monitors the content of any filesystem subtree and periodically replicates any data which has not yet been replicated from a source tree to a destination tree. Replication is preferably used for subtrees not placed in shared storage The Matrix Communication Service 524 provides the network communication infrastructure for the DLM 500, Matrix Membership Service 508, and SAN Membership Service 506. The Matrix Filesystem 504 does not use the MCS 524 directly, but it does use it indirectly through these other components.

The Storage Control Layber (SCL) 526 provides matrix-wide device identification, used to identify the Matrix Filesystems 504 at mount time. The SCL 526 also manages storage fabric configuration and low level I/O device fencing of rogue servers from the shared storage devices 306a-306d containing the Matrix Filesystems 504. It also provides the ability for a server in the matrix to voluntarily intercede during normal device operations to fence itself when communication with rest of the matrix has been lost.

The Storage Control Layer 526 is the Matrix Server module responsible for managing shared storage devices 306a-306d. Management in this context consists of two primary functions. The first is to enforce I/O fencing at the hardware SAN level by enabling/disabling host access to the set of shared storage devices 306a-306d. And the second is to generate global (matrix-wide) unique device names (or "labels") for all matrix storage devices 306a-306d and ensure that all hosts in the matrix have access to those global device names. The SCL module also includes utilities and library routines needed to provide device information to the UI.

The Pseudo Storage Driver 528 is a layered driver that "hides" a target storage device 306a-306d so that all references to the underlying target device must pass through the PSD layered driver. Thus, the PSD provides the ability to "fence" a device, blocking all I/O from the host server to the underlying target device until it is unfenced again. The PSD also provides an application-level interface to lock a storage partition across the matrix. It also has the ability to provide common matrix-wide 'handles', or paths, to devices such that all servers accessing shared storage in the Matrix Server can use the same path to access a given shared device.

Figure 6:
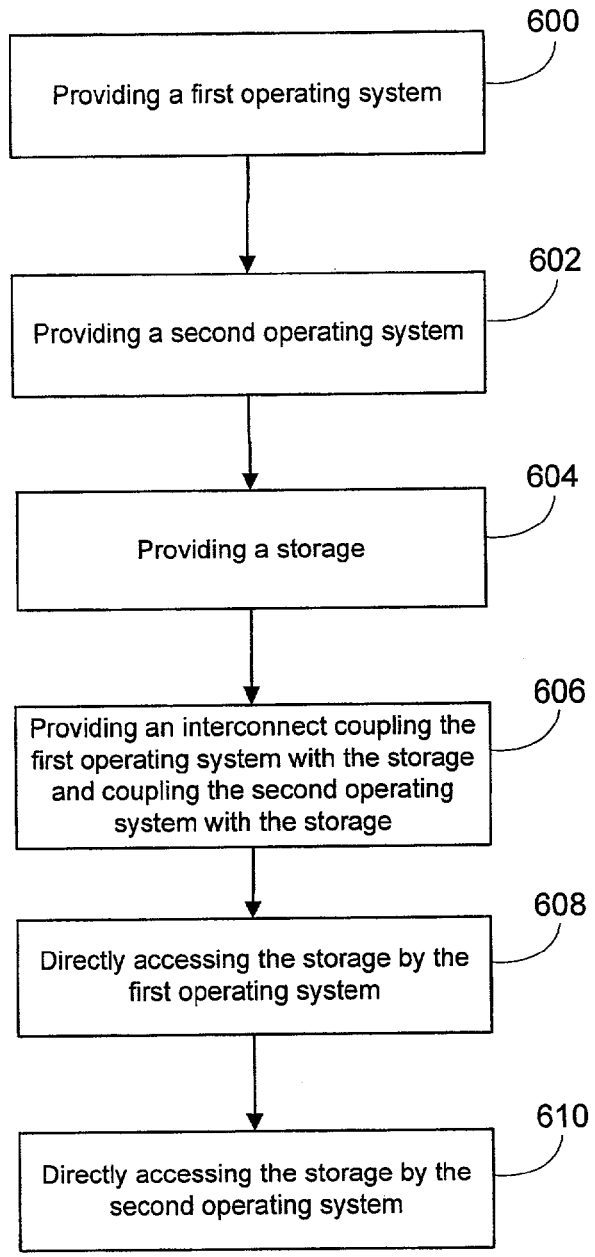
FIG. 6 is a flow diagram of a method for a multi-node environment according to an embodiment of the present invention.

FIG. 6 is a flow diagram of a method for a multi-node environment according to an embodiment of the present invention. In this example, a first operating system is provided (600), and a second operating system is also provided (602). The second operating system is preferably independent of the first operating system. They can be the same operating system, such as both operating systems being Linux, or different operating systems, such as different versions of Windows or a Unix and a Linux, but each running a separate OS rather than a combined OS. A storage is also provided (604). An interconnect coupling the first operating system with the storage and coupling the second operating system with the storage is then provided (606). The storage is then directly accessed by the first operating system (608), and the storage is also directly accessed by the second operating system (610).

Figure 7A:
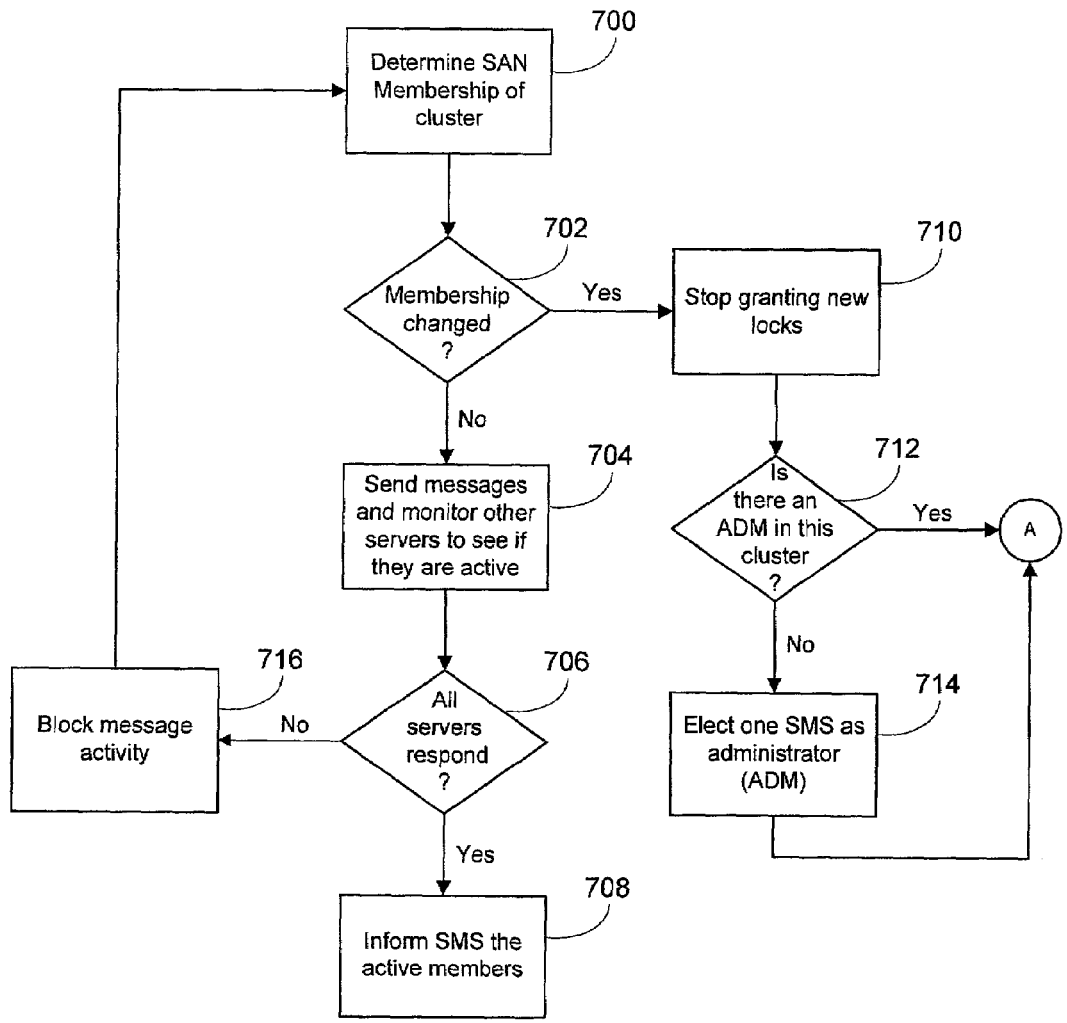
FIGS. 7A-7C are other flow diagrams of a method according to an embodiment of the present invention for a multi-node environment.
Figure 7B:
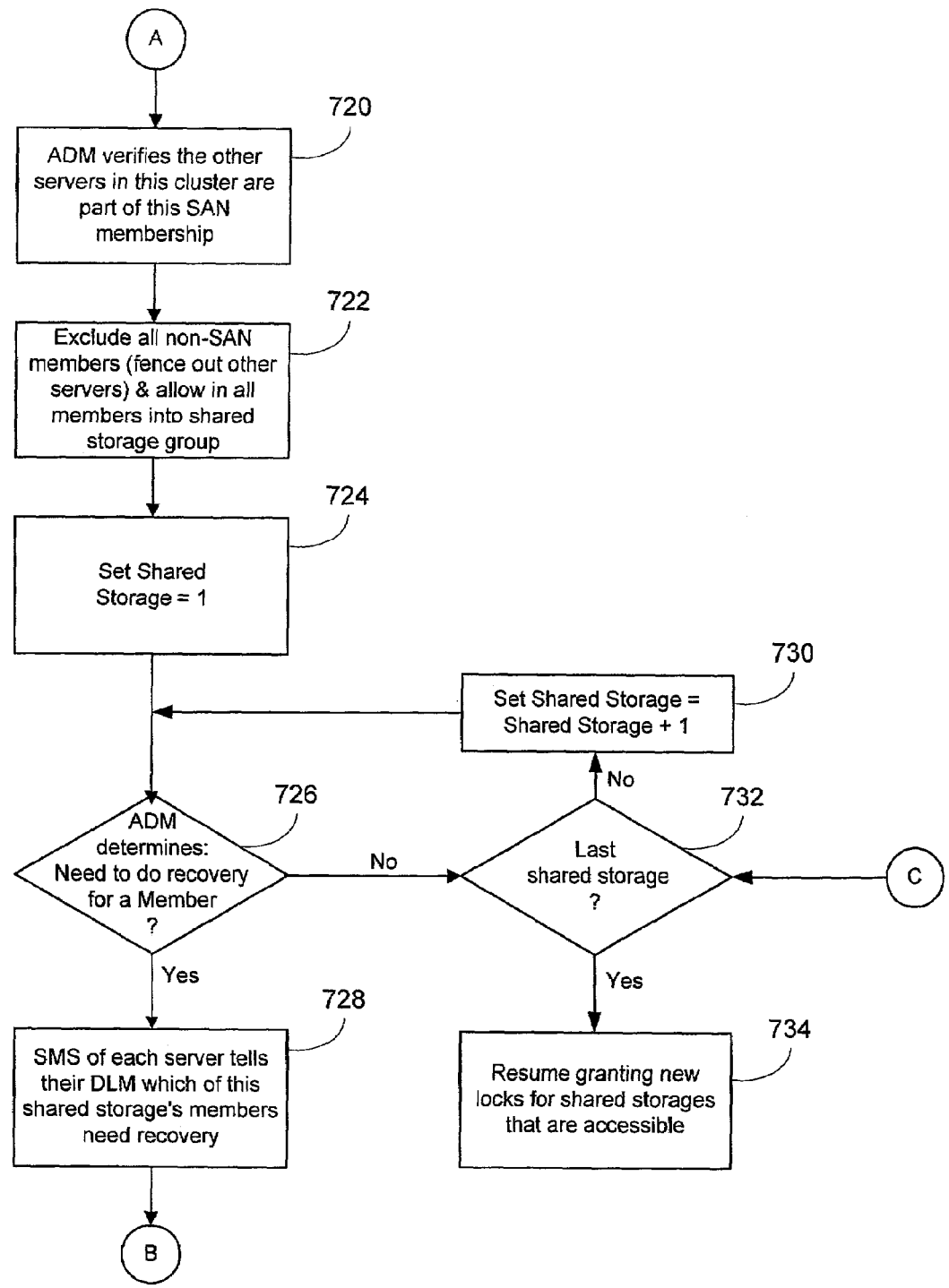
Figure 7C:
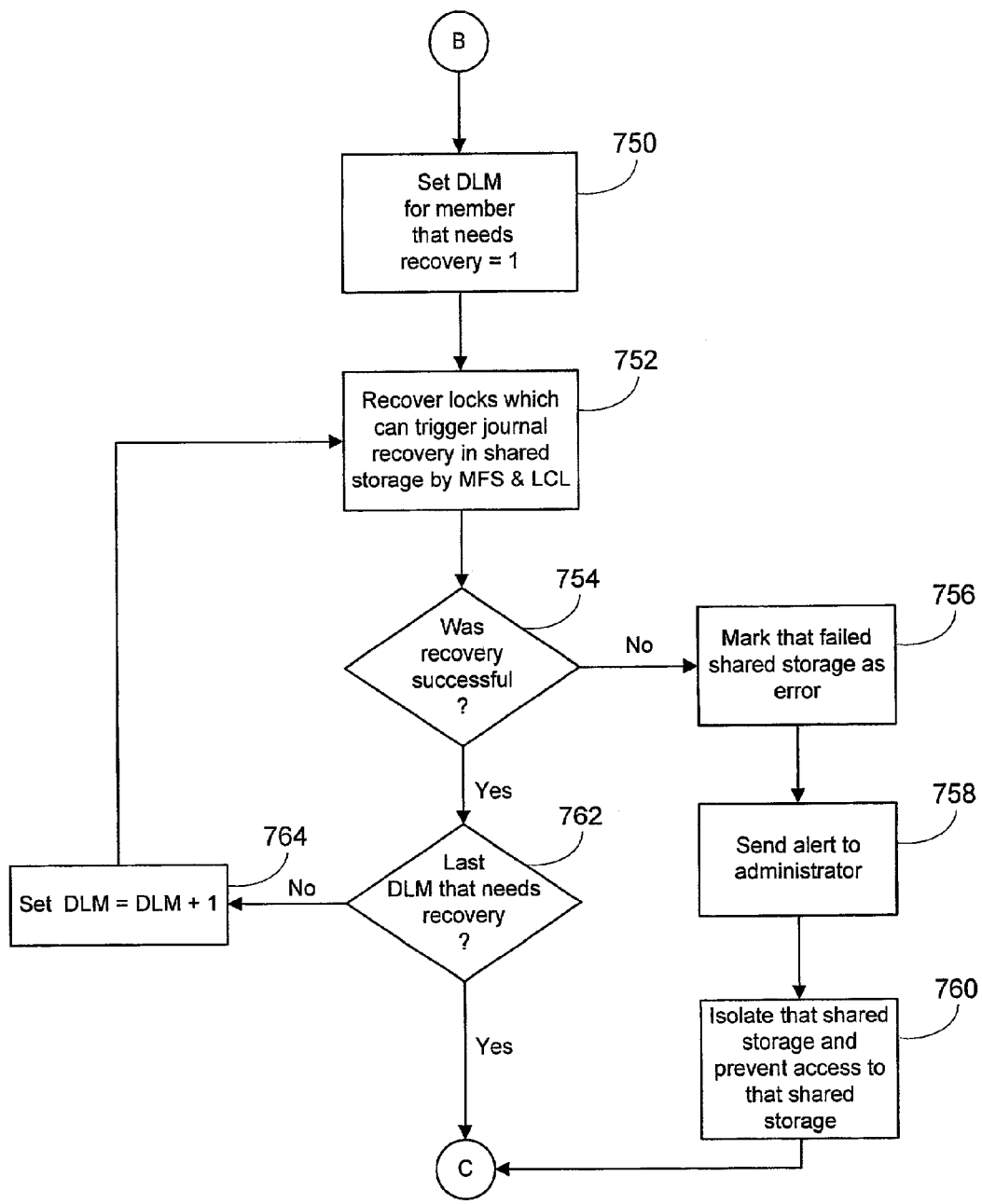

FIGS. 7A-7C are other flow diagrams of a method according to an embodiment of the present invention for a multi-node environment. The following terms are used herein.

Group membership is used herein to refer to a set of cooperating processes (programs) that form a communication group. For example, a group membership can be formed between servers. SAN membership is used herein to refer to a storage area membership. SAN membership refers to the group of servers that are communicating which are allowed to read/write the Storage area network resources such as disks and switches. Shared storage group membership is used herein to refer to the set of servers actively using a single filesystem located on the SAN. An example is the set of servers that have "mounted" the filesystem to make it accessible to user programs. Cluster membership refers to the set of servers forming a single cluster which actively share filesystems and network resources as a logical whole.

In this example, a membership of a cluster of servers is determined (700). As previously mentioned, servers are used as an example, however, any node, computer or processor can be used. A cluster, as used herein, can be any two or more servers, computers, processors, or any combination thereof, that is associated with a membership.

It is then determined whether the membership of the cluster has changed (702). At time zero, there will be no change to the membership since there is no history of the membership. At some later time, the membership may be changed, for example, if a server is taken off line, or a new server is added. In addition to the change in the numbers of servers that are utilized, determining whether the membership has changed can also accommodate a situation where a server has failed, a server has been added, or has been taken out of the cluster.

If the cluster membership has not changed (702), then each server sends messages to the other servers and monitors the messages to see if the other servers are active (704). It is then determined whether all servers respond (706). If all the other servers in the cluster respond to the messages, then the storage area network (SAN) membership service (SMS) is informed of the active members of the cluster (708). If, however, all servers in the cluster do not respond (706), then message activity is blocked (716). Blocking message activity avoids stale messages between membership changes. Once message activity is blocked, the membership of the cluster is again determined (700).

If the cluster membership has changed (702), then new locks are no longer granted (710). It is then determined whether there is an administrator (ADM) in this cluster (712). If there is no administrator in this cluster, then one of the members of the cluster is elected as administrator (714). In the example shown in FIG. 5, the SAN membership service (SMS) 506 can be used as an administrator.

The administrator verifies that the other servers in this cluster are part of this storage area membership (720) of FIG. 7B. Step 720 accommodates both when all of the servers are part of the cluster, or when there are servers outside the cluster.

There may be separate clusters operating in the storage area network either by design or by accident. In either case servers misconfigured software may result in a server attaching to the shared storage and attempting to access it, without knowledge of the valid cluster. If nodes are outside the cluster then the administrator excludes (fences) those servers to prevent corruption of data on shared storage. Servers that successfully gain membership to the network cluster are then allowed access to the shared storage and are then part of the SAN membership.

All cluster non-members are then excluded and all cluster members are allowed into the shared storage group (722). Accordingly, servers outside the cluster membership are excluded from accessing the discs 306A-306D of FIG. 5.

Shared storage is then set to equal one (724). It is determined by the ADM whether recovery is necessary for a member of this shared storage group (726).

If no recovery is required for a member of this shared storage group, then it is determined whether this is the last shared storage (732). If it is not the last shared storage, then the shared storage is then set to shared storage plus one (730), and the next shared storage is evaluated by having the administrator determine whether recovery is necessary for a member of that shared storage (726). If, however, this shared storage was the last shared storage, then the granting of new locks are resumed for shared storages that are accessible (734).

If the administrator determines that recovery is necessary for a member of this shared storage (726), then it is determined which member(s) of this shared storage needs recovery (728). For example, the SAN membership service (SMS) of each server can tell their distributed lock manager (DLM) whether that server needs recovery.

The server that needs recovery is analyzed. In this example, the DLM for the member that needs recovery is set equal to one (750). Locks which can trigger journal recovery in the shared storage by the matrix file system (MFS) and the lock caching layer (LCL) are then recovered (752).

It is then determined whether recovery was successful (754). If the recovery was successful then it is determined whether this server was the last server that required recovery (762). If this server was not the last server that required recovery, then the next server that needed recovery is analyzed by setting DLM equals DLM plus one (764). The locks are then recovered for this next server (752). If, however, this server was the last server that needed recovery (762), then it is determined whether this shared storage is the last shared storage that needed to be analyzed (732 of FIG. 7B).

If recovery of the locks was not successful (754 of FIG. 7C), then that failed shared storage is marked as error (756), and an alert is sent to a human system operator (758).

The failed shared storage is then isolated and access to that shared storage is prevented (760). It is then determined whether this shared storage is the last shared storage that needs to be analyzed (732 of FIG. 7B).

Figure 8:
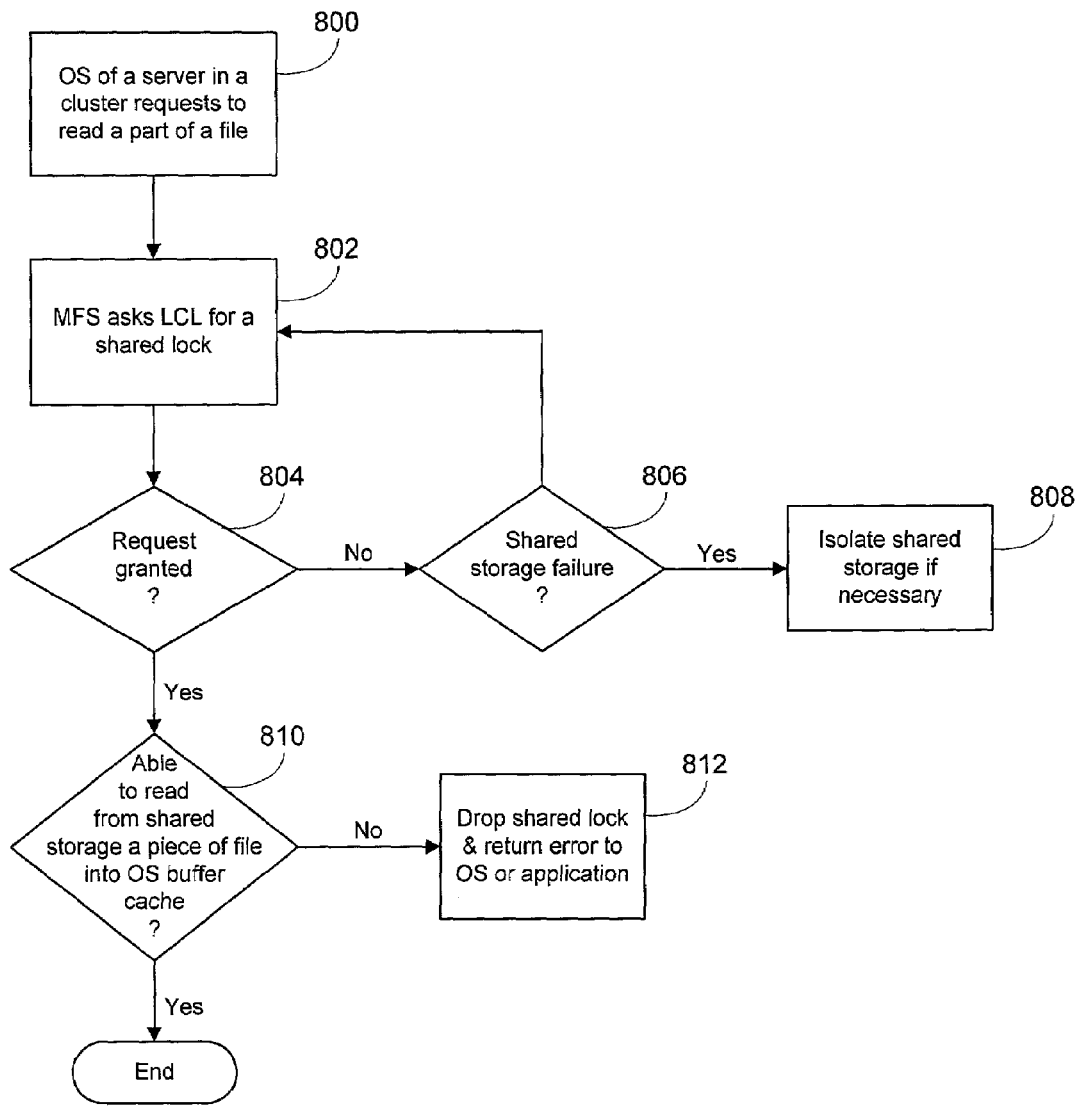
FIG. 8 is a flow diagram of a method according to an embodiment of the present invention for reading a file.

FIG. 8 is a flow diagram of a method according to an embodiment of the present invention for reading a file from shared storage. The operating system of a server in a cluster requests to read a part of a file (800).

A shared lock request is provided (802). For example, the matrix file system (MFS) 504 of FIG. 5 asks the lock caching layer (LCL) 502 of FIG. 5 for a shared lock. It is then determined whether the request is granted (804). If the request for the shared lock is not granted, then it is determined whether there is a shared storage failure (806).

If there is a share storage failure, then the shared storage is isolated if necessary (808). If, however, there is no shared storage failure then the MFS asks the LCL for a shared lock (802). It is then determined whether the shared lock request is granted (804).

If the shared lock request is granted (804), then it is determined whether the server is able to read a piece of the requested file from the shared storage into the operating system buffer cache (810). If the server is able to read the file into the OS buffer cache then the process is complete. If, however, the server is unable to read into the OS buffer cache then the shared lock is dropped and an error is returned to the operating system or application (812). An example of when such an error might occur is if there is a disk failure or a connection failure.

Figure 9A:
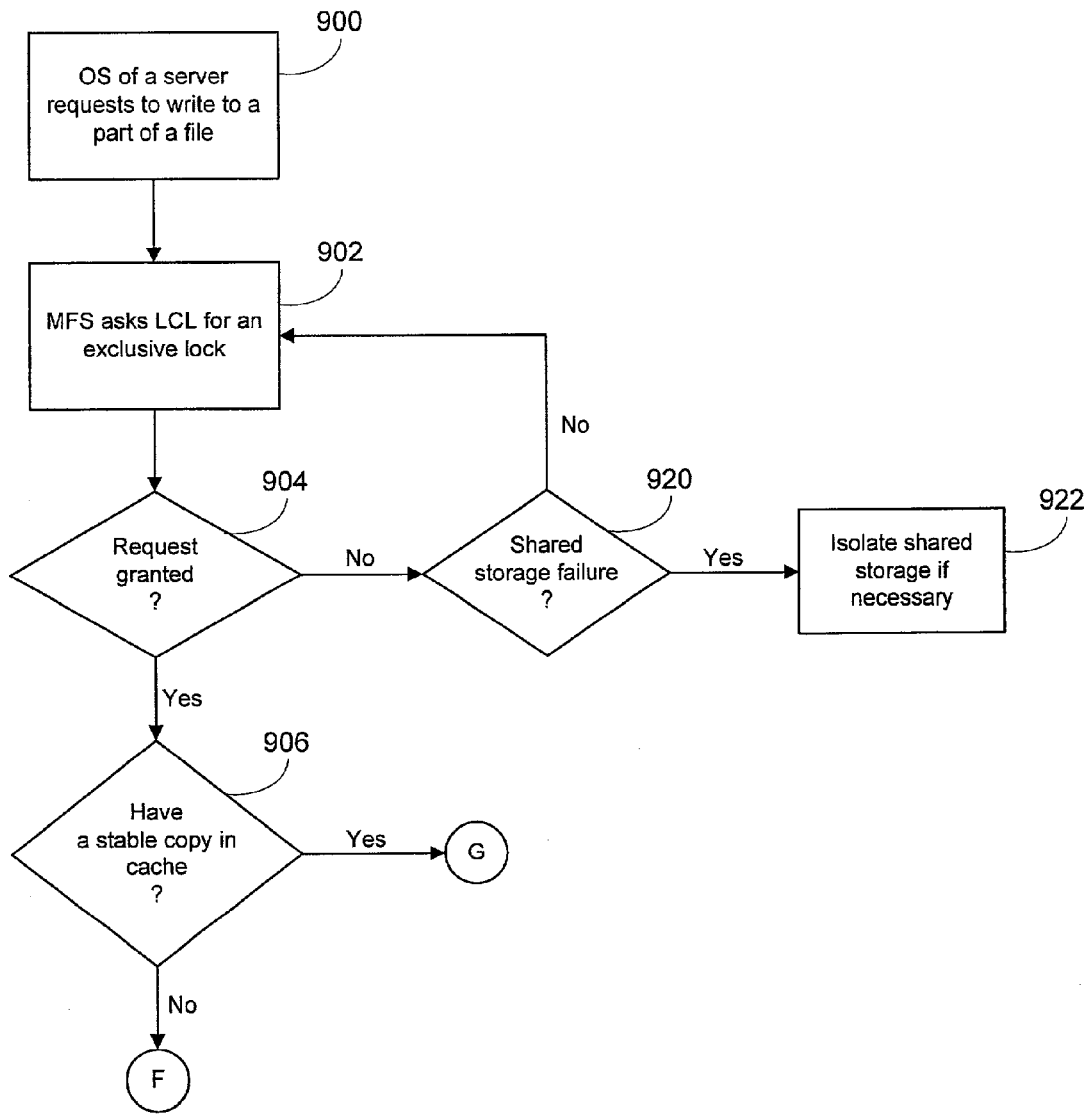
FIGS. 9A-9B are flow diagrams of a method according to an embodiment of the present invention for writing to a file.
Figure 9B:
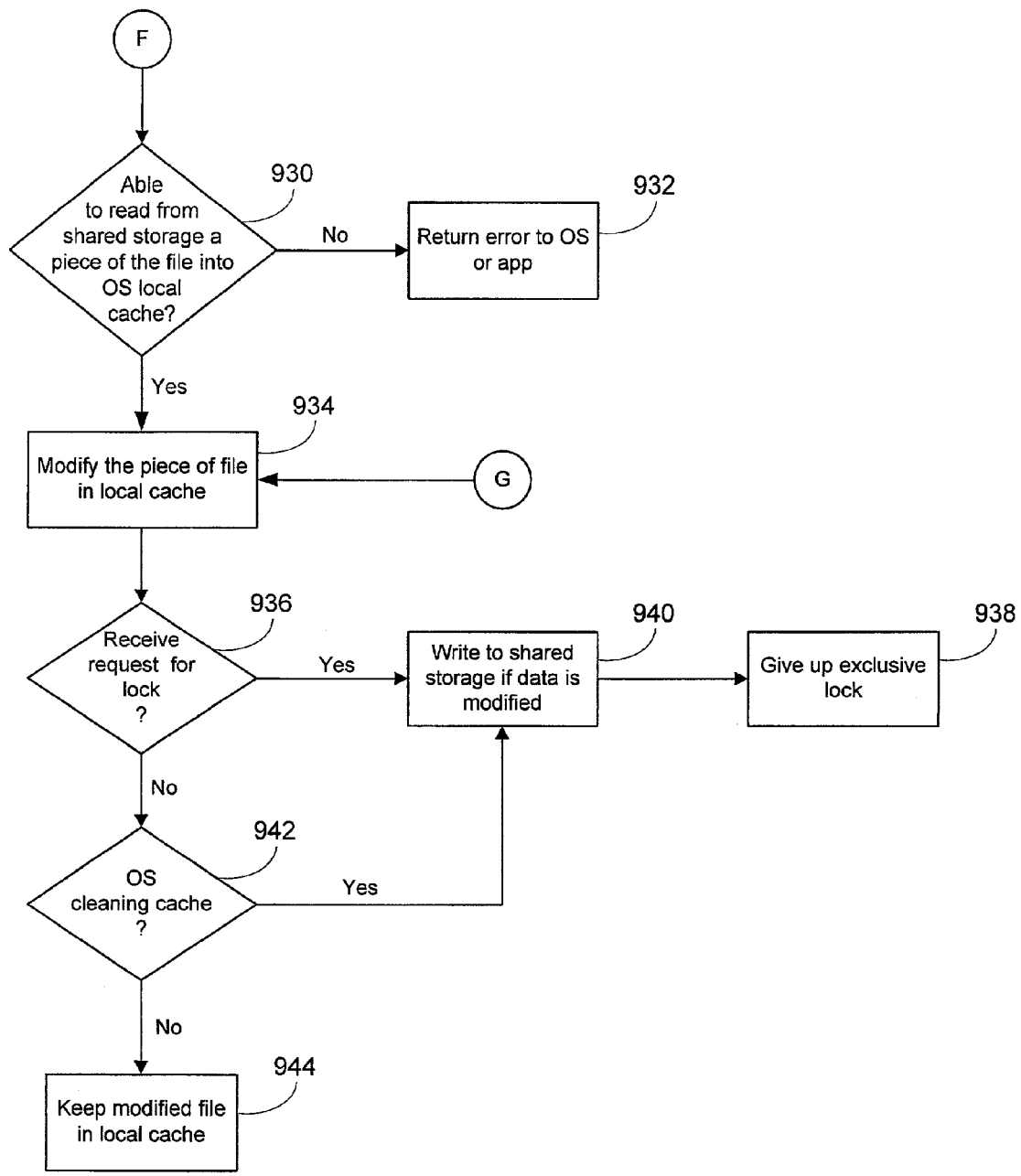

FIGS. 9A-9B are flow diagrams of a method according to an embodiment of the present invention of writing to a file in a shared storage.

In this example, the operating system of a server requests to write to a part of a file (900). The matrix file system (MFS) 504 of FIG. 5 asks the lock caching layer (LCL) for an exclusive lock (902). It is then determined whether the request for an exclusive lock is granted (904). If the request for the exclusive lock is not granted then it is determined whether there is a shared storage failure (920). If there is a shared storage failure, then that shared storage is isolated, if necessary (922). If, however, there is no shared storage failure (920), then there is another request for the exclusive lock (902).

If the request for an exclusive lock is granted (904), then it is determined whether there is a stable copy of the requested part of the file in the local cache (906). If there is a stable copy in the cache then the piece of file is modified in the local cache (934 of FIG. 9B). If however, there is no stable copy in the local cache (906), then it is determined if the piece of the requested file can be successfully read from the shared storage into the operating system local cache (930). If the server could not read the file into the local cash, then an error is returned to the operating system or the application (932). If, however, the file was successfully read into the local cache then the piece of file is modified in the local cache (934).

It is then determined whether a request for a lock for this particular file has been received (936). If a request for a lock for this file has been received, and the file has been modified, then the modified data is written to the shared storage (940). The server then gives up the exclusive lock on this file (938).

If no request has been received for a lock for this file (936), then it is determined whether the operating system is cleaning out the local cache (942). If the cache is being cleaned, then the modified data is written to the shared storage (940) and any locks are maintained unless there is an outstanding request from another server. Otherwise, the modified file is kept in the local cache (944). By keeping the modified file in the local cache until it is needed by another server, access to the file is made faster for the server that maintains the file in its local cash.

Figure 10A:
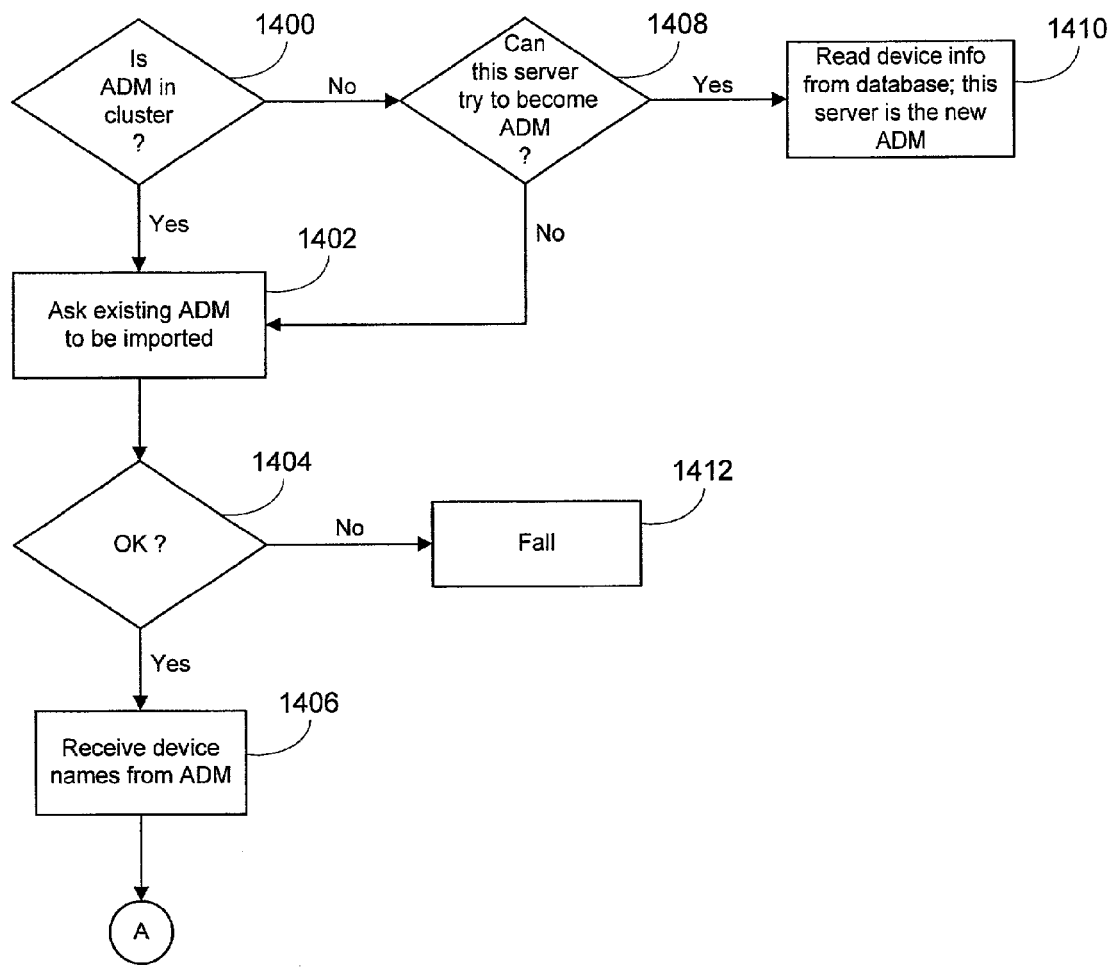
FIGS. 10A-10B are flow diagrams of a method according to an embodiment of the present invention for adding a node to a cluster of servers sharing storage such as a disk.
Figure 10B:
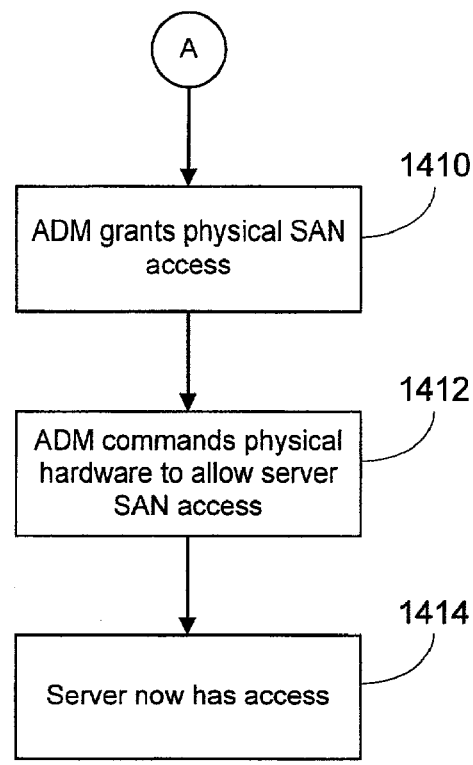

FIGS. 10A-10B are flow diagrams of a method according to an embodiment of the present invention for adding a node to a cluster of servers sharing storage such as a disk.

In this example, it is determined whether there is an administrator (ADM) in the cluster (1400). The cluster includes the set of servers that cooperate to share a shared resource such as the shared storage. One of the servers in the cluster act as an administrator to manage the cluster. If there is no administrator in the cluster, then it is determined whether this server can try to become the administrator (1408). If this server can try to become the administrator then the server reads the device information from the database and it is now the new administrator (1410).

If there is an administrator in the cluster (1400), or if this server can not become the new administrator (1408), then it asks the existing administrator to be imported into the cluster (1402). An example of how this server can not become the administrator (1408) is if another server became the administrator during the time this server established that there was no administrator and then tried to become the administrator.

It is then determined whether it is permissible for this server to be imported into the cluster (1404). If it is not permissible then the process of adding this server to the cluster has failed (1412). Examples of reasons why adding the server would fail include this server not being healthy or having a storage area network generation number mismatch with the generation number used by the administrator.

If this server can be imported (1404), then it receives device names from the administrator (1406). Examples of device names include names of shared storage.

The administrator grants physical storage area network access to this server (1410 of FIG. 10B). The administrator then commands the physical hardware to allow this server storage area network (SAN) access (1412). This server now has access to the SAN (1414).

Figure 11A:
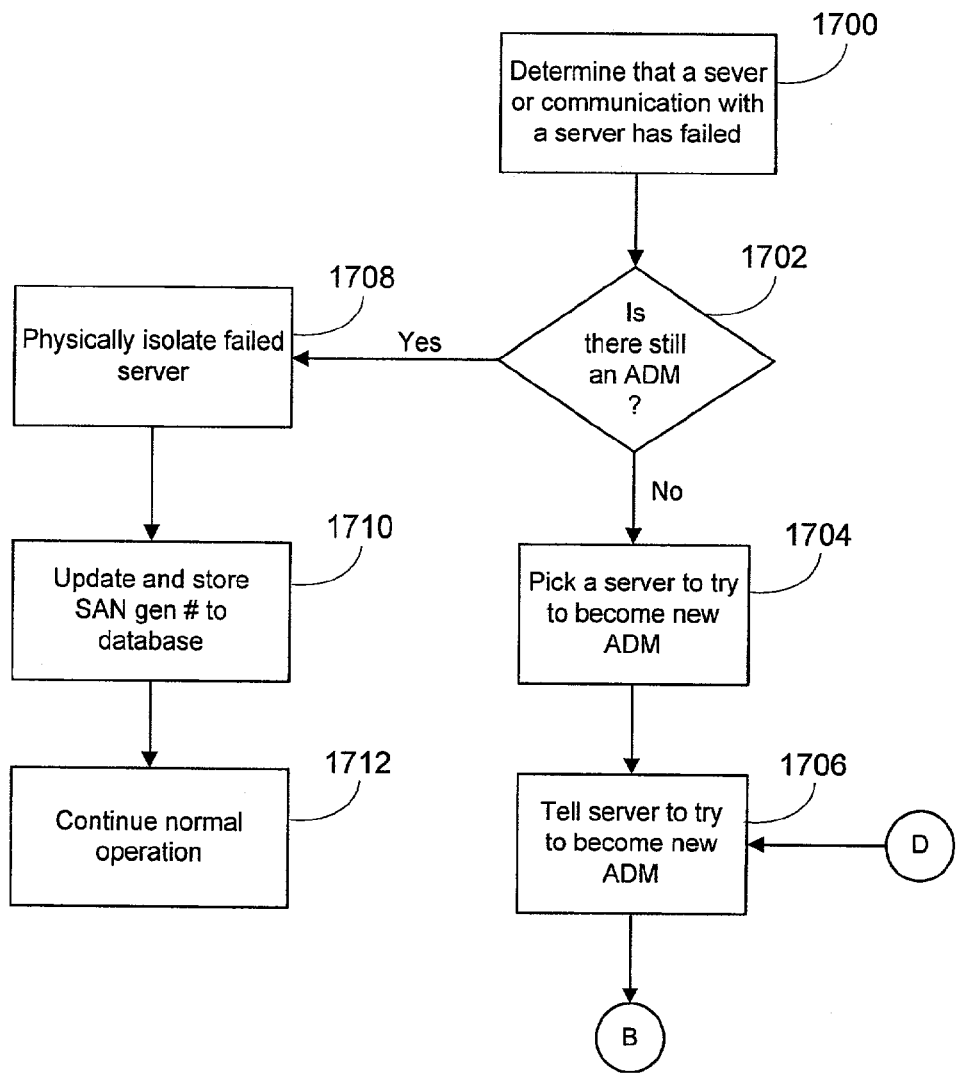
FIGS. 11A-11C are flow diagrams of a method according to the present invention for handling a server failure.
Figure 11B:
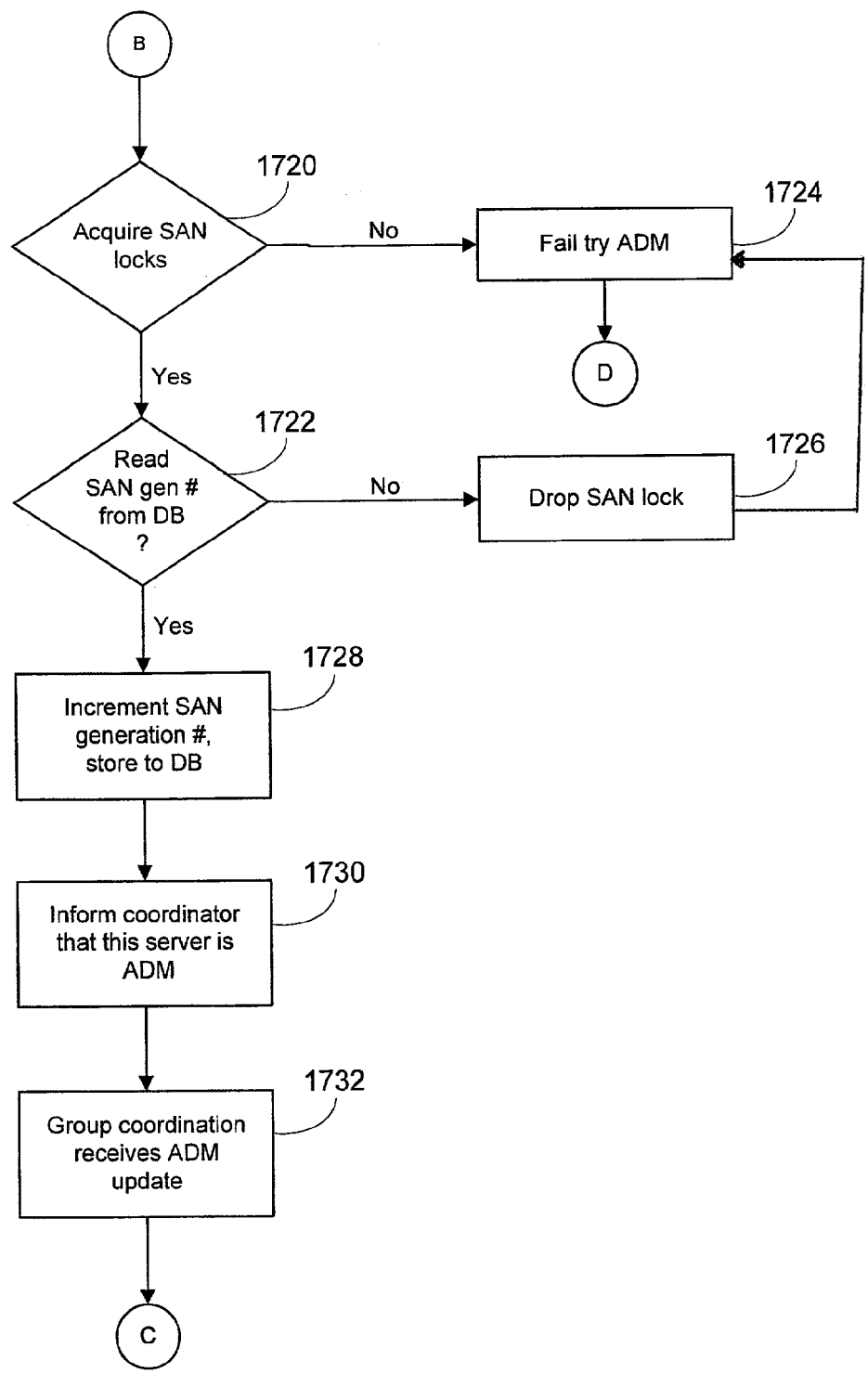
Figure 11C:
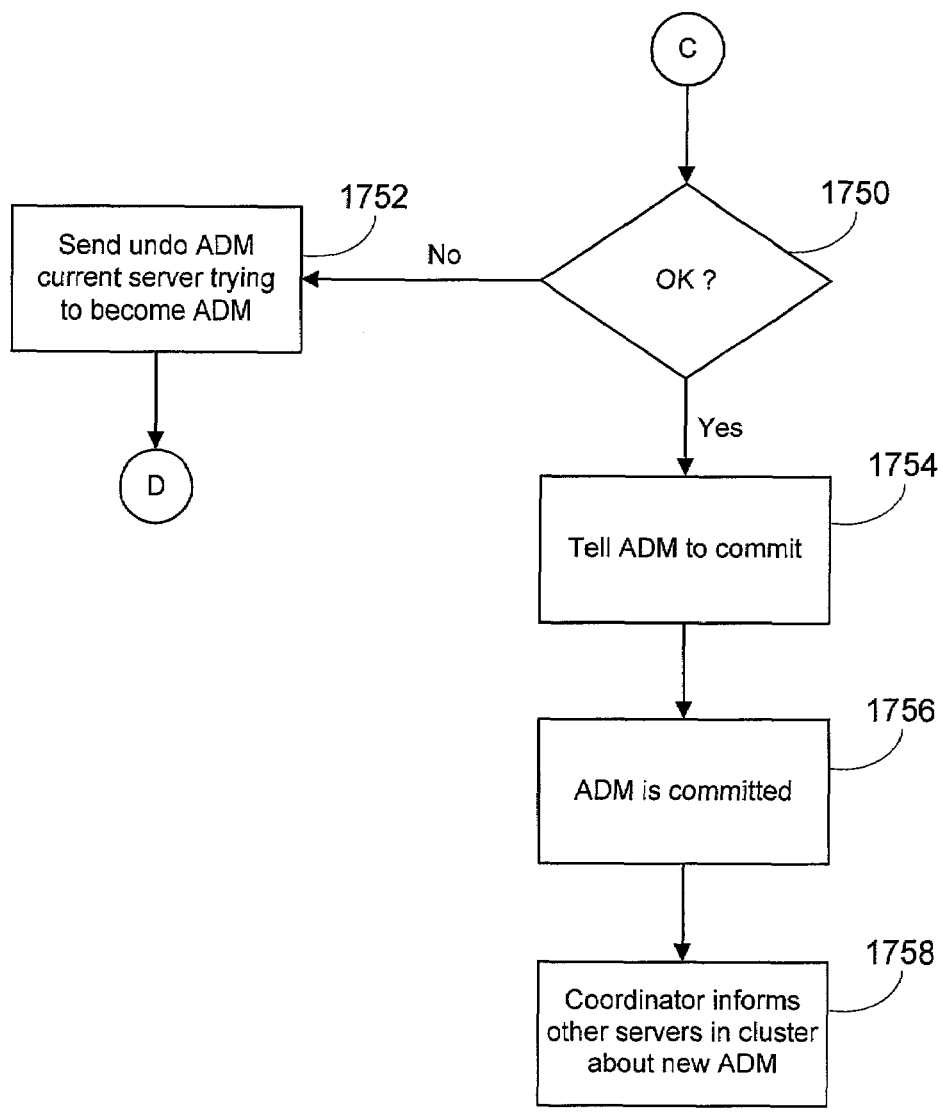

FIGS. 11A-11C are flow diagrams of a method according to the present invention for handling a server failure. In this example, it is determined that a server or communication with a server has failed (1700). It is then determined whether there is still an administrator (1702). For example, the server that failed may have been the administrator. If there is still an administrator then the failed server is physically isolated (1708). An example of physically isolating the failed server is to disable the port associated with the failed server.

The storage area network generation number is then updated and stored to the database (1710). Thereafter, normal operation continues (1712).

If there is no longer an administrator (1702), then a server is picked to try to become the new administrator (1704). There are several ways to select a server to try to become the new administrator. One example is a random selection of one of the servers. The elected server is then told to try to become the new administrator (1706). One example of how the server is selected and told to become the new administrator is through the use of a group coordinator.

In one embodiment, the group coordinator is elected during the formation of a process communication group using an algorithm that can uniquely identify the coordinator of the group with no communication with any server or node except that required to agree on the membership of the group. For example, the server with the lowest numbered Internet Protocol (IP) address of the members can be selected. The coordinator can then make global decisions for the group of servers, such as the selection of a possible administrator. The server selected as administrator is preferably one which has a high probability of success of actually becoming the administrator. The group coordinator attempts to place the administrator on a node which might be able to connect the SAN hardware and has not recently failed in an attempt to become the SAN administrator.

The selected server then attempts to acquire the storage area network locks (1720). If it cannot acquire the SAN locks, then it has failed to become the administrator (1724). If it succeeds in acquiring the SAN locks (1720), then it attempts to read the SAN generation number from the membership database (1722). The database can be maintained in one of the membership partitions on a shared storage and can be co-resident with the SAN locks If the server fails to read the SAN generation number from the database (1722), then it drops the SAN locks (1726), and it has failed to become the administrator (1724). Once the server has failed to become the administrator (1724), the group coordinator tells a server to try to become the new administrator (1706 FIG. 5A).

If the server can read the SAN generation number from the database, then it increments the SAN generation number and stores it back into the database (1728). It also informs the group coordinator that this server is now the administrator (1730). The group coordinator receives the administrator update (1732). It is then determined if it is permissible for this server to be the new administrator (1750). If it is not okay, then a message to undo the administrator status is sent to the current server trying to become the administrator (1752). Thereafter, the group coordinator tells another server to try to become the new administrator (1706 of FIG. 11A).

If it is okay for this server to be the new administrator, the administrator is told to commit (1754), and the administrator is committed (1756). The coordinator then informs the other servers in the cluster about the new administrator (1758).

Figure 12:
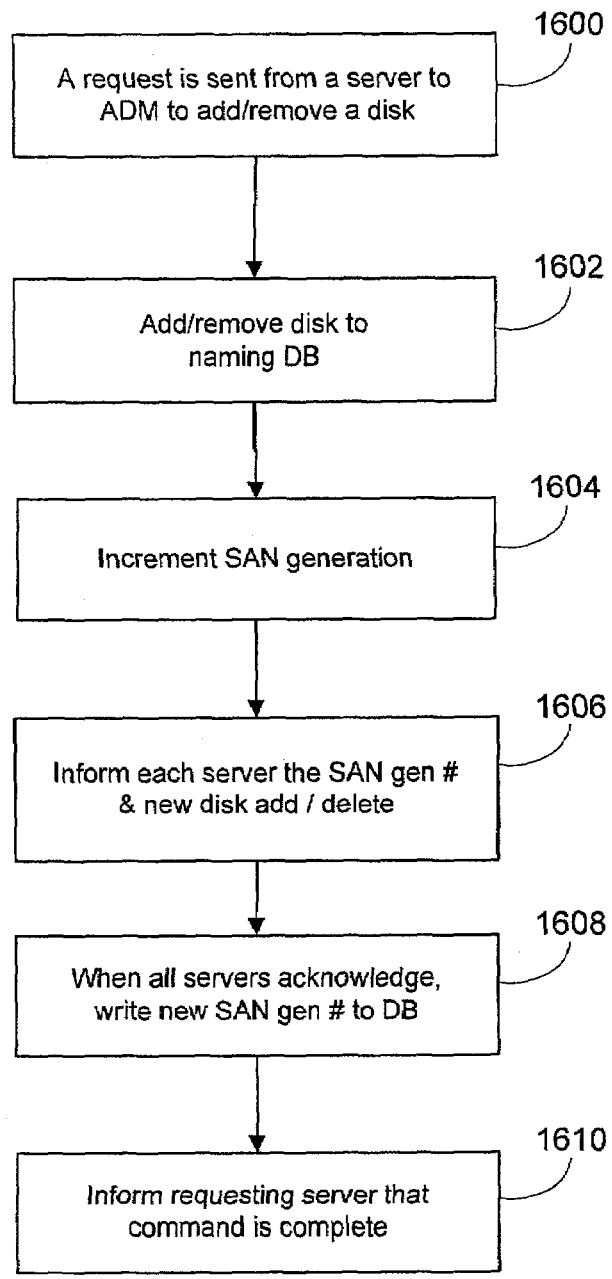
FIG. 12 is flow diagram of a method according to an embodiment of the present invention for adding or removing shared storage.

FIG. 12 is flow diagram of a method according to an embodiment of the present invention for adding or removing shared storage. In this example, a request is sent from a server to the administrator to add or remove a shared storage (1600), such as a disk. The disk is then added or removed to the naming database (1602). The naming database can be maintained on the shared storage accessible by all servers and known by all servers in advance when they join the cluster. Servers with no knowledge of the location of a naming database are preferably not eligible to become a SAN administrator.

The SAN generation number is then incremented (1604). Each server in the cluster is then informed of the SAN generation number and the addition or deletion of the new disk (1606). When all the servers in the cluster acknowledge, the new SAN generation number is written to the database (1608). The requesting server is then notified that the addition/removal of the disk is complete (1610).

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may modified within the scope and equivalents of the appended claims.

What is claimed is:

1. A system for a multi-node environment comprising:
a first node associated with a first operating system;
a second node associated with a second operating system, wherein the second operating system is independent of the first operating system;
a storage;
an interconnect coupling the first node with the storage and coupling the second node with the storage; and
wherein the first node directly accesses the storage and the second node directly accesses the storage, the first node and the second node share at least a same portion of the storage without relying on locking functionality built into the storage, and the interconnect is configured to allow a third node to be added to the interconnect when an administrator node grants the third node access to the storage, and wherein the administrator node comprises the first node, the second node, or the third node.

2. The system of claim 1, wherein the first operating system is a different operating system than the second operating system.

3. The system of claim 1, wherein the storage is coherent shared file storage.

4. The system of claim 1, wherein the interconnect is a shared disk interconnect.

5. The system of claim 1, wherein the second node is dynamically decoupled wherein the second node no longer directly accesses the storage.

6. The system of claim 1, further comprising a second storage that is dynamically added such that the second storage is directly accessible by the first and second nodes.

7. The system of claim 1, further comprising a second storage wherein the second storage is directly accessible by the first and second nodes, and wherein the second storage is dynamically decoupled from the first and second nodes such that the second storage is no longer directly accessible by the first and second nodes.

8. A system for a multi-node environment comprising:
a first node associated with a membership group, wherein the first node is associated with a first operating system;
a second node associated with the membership group, wherein the second node is associated with a second operating system, and wherein the second operating system is independent of the first operating system;
storage coupled with the first and second nodes, the storage being directly accessible by the first node and the second node and the first node and the second node share at least a same portion of the storage without relying on locking functionality built into the storage; and
wherein the first node is configured to determine whether the membership group has changed, and the membership group is configured to allow a third node to be added to the membership group when an administrator node grants the third node access to the storage, and wherein the administrator node comprises the first node, the second node, or the third node.

9. The system of claim 8, wherein the first node dynamically adjusts to the change in the membership group.

10. A method for managing a multi-node environment comprising:

associating a first node with a membership group, wherein the first node is associated with a first operating system, and wherein the first node directly accesses a storage;

associating a second node with the membership group, wherein the second node is associated with a second operating system, and wherein the second operating system is independent of the first operating system, and wherein the second node directly accesses the storage;

determining whether the membership group has changed; and dynamically adjusting to the change in the membership group;

wherein the first node and the second node share at least a same portion of the storage without relying on locking functionality built into the storage, and the membership group is configured to allow a third node to be added to the membership group when an administrator node grants the third node access to the storage, and wherein the administrator node comprises the first node, the second node, or the third node.

11. The method of claim 10, wherein the first operating system is a different operating system than the second operating system.

12. The method of claim 10, wherein the membership group changed due to adding the third node to the membership group.

13. The method of claim 10, wherein the third node is associated with the membership group and wherein the membership group changed due to subtracting the third node from the membership group.

14. The method of claim 10, further comprising determining whether recovery needs to be performed if the membership group has changed.

15. The method of claim 10, further comprising recovering locks if the membership group has changed and if a recovery is necessary.

16. The method of claim 10, further comprising stopping granting of new locks if the membership group has changed.

17. A system for a first node configured to be associated with a multi-node environment comprising:

a processor configured to be associated with a first operating system, wherein the first operating system is independent of a second operating system of a second node; the processor also configured to be capable of determining whether a membership group has changed, wherein the membership group is associated with the first node and the second node; and also configured to be capable of dynamically adjusting to the change in the membership group; and a storage coupled to the processor, wherein the storage is configured to be directly accessed by the processor and also configured to be directly accessed by the second node, and the first node and the second node share at least a same portion of the storage without relying on locking functionality built into the storage;

wherein the membership group is configured to allow a third node to be added to the membership group when an administrator node grants the third node access to the storage, and wherein the administrator nodes comprises the first node, the second node, or the third node.

18. A computer program product for a first node configured to be associated with a multi-node environment, the computer program product being embodied in a computer readable storage medium comprising computer instructions for:

determining whether a membership group has changed, wherein the membership group is associated with the first node and a second node, and wherein the first node is associated with a first operating system and the second node is associated with a second operating system, and wherein the first operating system is independent of the second operating system;

dynamically adjusting to the change in the membership group; and directly accessing a storage, wherein the storage is also directly accessible by the second node, and the first node and the second node share at least a same portion of the storage without relying on locking functionality built into the storage;

wherein the membership group is configured to allow a third node to be added to the membership group when an administrator node grants the third node access to the storage, and wherein the administrator node comprises the first node, the second node, or the third node.

* * * * *